Jan. 9, 1968  C. F. RIDDLE  3,362,482
ROTOR FOR GROUND WORKING EQUIPMENT
Filed March 1, 1965  3 Sheets-Sheet 1
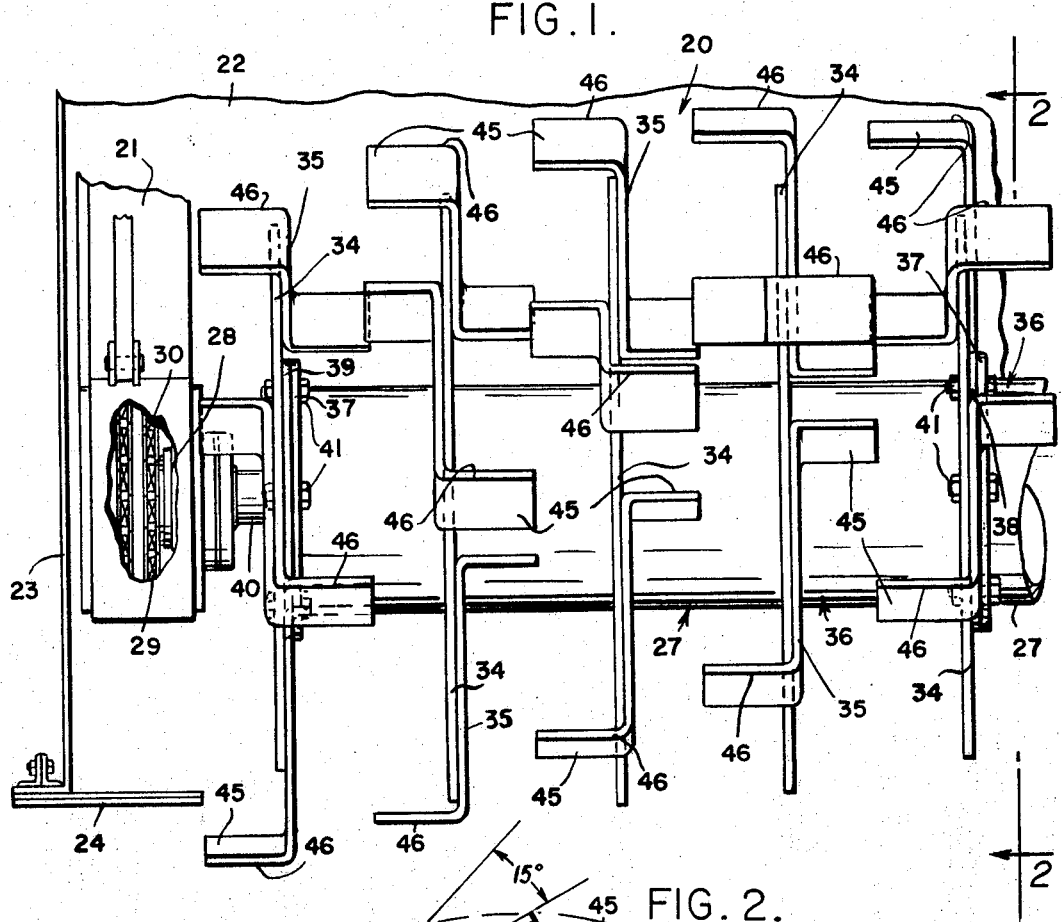
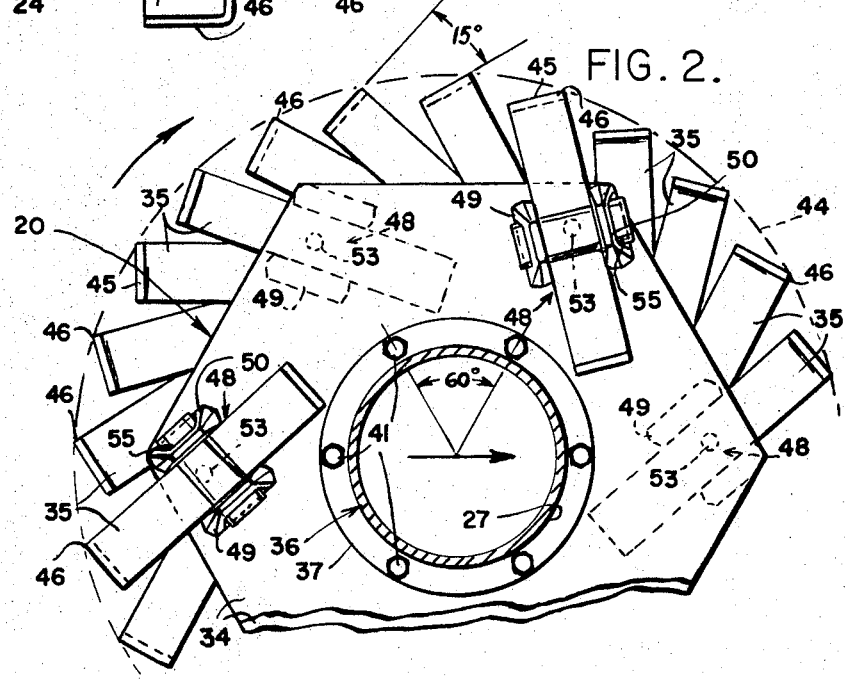

Jan. 9, 1968 C. F. RIDDLE 3,362,482
ROTOR FOR GROUND WORKING EQUIPMENT
Filed March 1, 1965 3 Sheets-Sheet 2

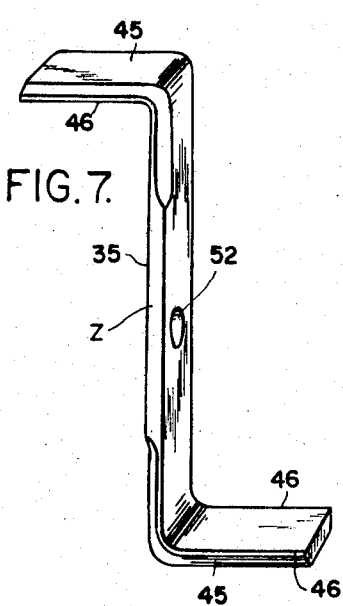
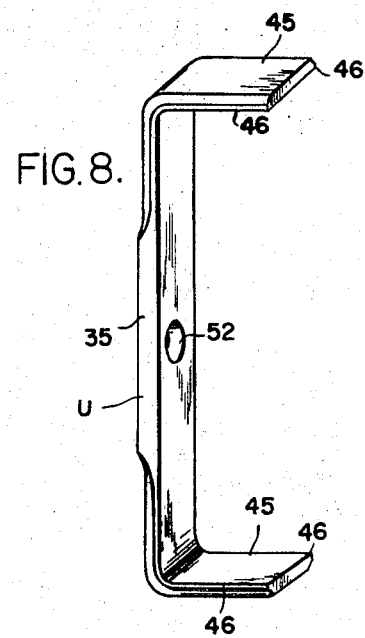
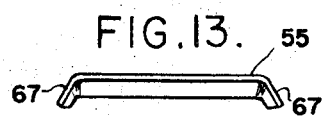
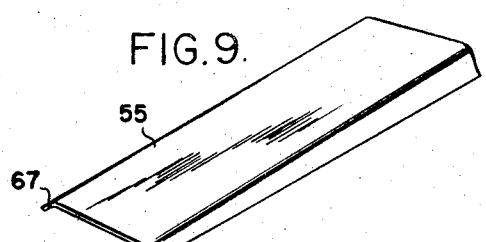
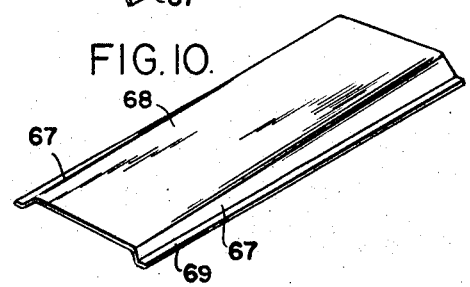
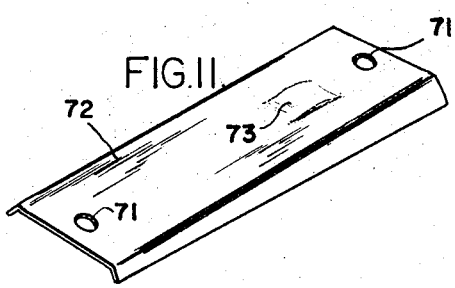
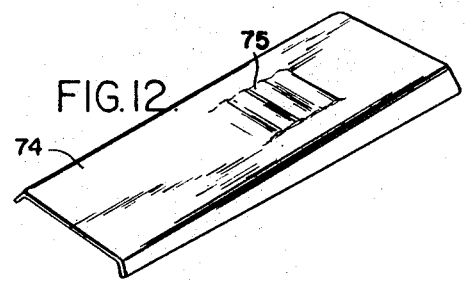

United States Patent Office 3,362,482
Patented Jan. 9, 1968

3,362,482
ROTOR FOR GROUND WORKING EQUIPMENT
Charles F. Riddle, Milwaukee, Wis., assignor to Rex Chainbelt Inc., Milwaukee, Wis., a corporation of Wisconsin
Filed Mar. 1, 1965, Ser. No. 436,248
15 Claims. (Cl. 172—119)

ABSTRACT OF THE DISCLOSURE

An improved digging and pulverizing tine and tine mounting assembly for an earth working machine. The tines are attached to carrying plates by easily removable resilient wedges. The improved tine is Z-shaped so as to allow successive use of each of four cutting edges.

This invention relates, generally, to rotary ground working equipment, and more particularly to an improved toothed rotor for a rotary digging or pulverizing implement such as used in road building, agricultural tilling, and the like.

In rotary pulverizers of the type to which this invention relates, a horizontally disposed rotor shaft carrying digging tines is advanced along the ground in its plane of rotation in such manner as to cause the tines to dig into and pulverize a swath of material of width substantially equal to the length of the rotor shaft.

Machines of this type are used to pulverize and stabilize the base materials for highways, runways, and the like, including the mixing of additives with the basic material to harden it and such machines also are used to clear and till land for growing crops.

Because of the difficult operating conditions usually encountered by implements of this nature, it is essential that the entire apparatus and more particularly the rotor structure including the tines be of robust construction in order to withstand the continuous pounding and twisting forces sustained by the machine.

In such machines, the tines on the rotor more especially are subject to severe shock stresses and abrasive actions since they contact directly the material being worked and often strike hidden obstacles. It is a basic requirement then that the tines be fastened securely to the rotor structure so that they will not become loose during operation and that they be of high quality heat treated steel in order to withstand as long as possible the pounding and abrading actions to which they are subjected. Nevertheless, the best of tines, when operating continuously, may wear away so rapidly that sometimes they require replacement at intervals of only a day or two. Since the tines become shorter through wearing away, the depth of operation of the rotor is reduced gradually as the tines wear out. Dull worn tines furthermore require more power to force them into the soil being worked. Accordingly, they must be replaced promptly when worn beyond further effective use.

Heretofore, the considerable number of individual tines on the usual pulverizing rotor have been fastened in place by bolts and nuts or generally similar fastening means. During operation these bolt and nut fasteners became partly worn away and sometimes became rusted in place or encrusted with hardened layers of the material that has been mixed by the machine. These conditions have made it unusually difficult to remove the nuts from the bolts and when they could not be removed by using wrenches it has been the practice to cut them off by means of a cutting torch. Obviously, the changing of tines under such conditions previously has been a laborious and time consuming operation and ordinarily it has required several hours to remove all of the worn tines from a rotor and replace them. During tine changing, the machine is out of service and is not available for use again until all of the worn tines have been replaced individually with securely fastened new tines.

It is, therefore, a general object of this invention to overcome prior difficulties by providing an improved arrangement for securing replaceable digging tines on a ground working rotor in such manner that they may be removed readily and quickly for replacement when worn.

It is another object of the present invention to provide an improved digging rotor for a rotary ground working implement that is better adapted to withstand the destructive forces encountered during operation.

Another object of the invention is to provide improved fastening means for releasably retaining expendable digging tines on the rotor of a rotary ground working implement.

Another object is to provide an improved digging tine holding arrangement whereby a replaceable tine may be fastened to the implement rotor quickly and securely in such manner that it may be released rapidly and readily for removal and replacement with minimum loss of time.

Another object is to provide improved securing means for a digging tine that is adapted to hold the tine firmly in position while permitting limited resilient yielding thereof to relieve shocks and unusual forces.

Another object is to provide improved digging tines for a rotary implement that are universally reversible to present any one of four cutting edges successively to the material being worked.

A further object is to provide an improved tine securing arrangement whereby a digging tine is held on a rotor by means of a readily releasable resilient wedge.

A still further object is to provide a tine holding arrangement in which a wedge that holds the tine is continuously driven tighter by action of the material being worked, yet may be released readily without special tools by blows of a hammer or the like.

According to this invention, a rotary ground working implement is provided with a transverse hollow tine shaft that is formed in sections, each section carrying several tine supporting plates. Each of the tine supporting plates is provided with improved means for releasably retaining replaceable digging tines that are arranged in angularly offset relationship to form a spiral pattern. Since the expendible digging tines wear away rapidly in use, it often becomes necessary to replace them at intervals of only a day or two under severe working conditions. Consequently, it is highly important to so mount the tines that they can be removed in the shortest possible time thereby reducing to a minimum the time lost while changing tines. Likewise, the tine mounting should be so arranged that new tines can be attached with equal facility and fastened securely to prevent them from coming loose during operation. The several tine carrying sections of the shaft are interconnected in such angular relationship that the tines form continuous spirals, the connections being so arranged that the shaft sections may be interchanged without disturbing the continuous spiral arrangement thereby insuring smooth operation while digging. The expendible digging tines preferably are formed of flat bar stock with shanks that fit against the sides of the tine plates, the flat bars being bent over at both ends to form transverse cutting heads. By bending both ends of the tine shank, two cutting heads are formed each with two sides and presenting in all, four cutting edges that may be used successively as they wear away in service, the tines being removed and reversed at intervals to present the new cutting edges. The tines are applied alternately to the opposite sides of the tine plates with the cutting heads extending longitudinally therefrom in opposite directions and at the proper approach angle to engage the ground being worked as the rotor turns. For positioning the tines angularly, abutment members are arranged on the plates to engage the respective side edges of each tine thereby forming tine sockets. To locate each cutting head at the proper radial position, each tine is provided with a central locating hole that fits over a complementary lug or stud on the tine plate between the socket abutments. Each of the tine socket abutments is in the form of a loop or stirrup extending outwardly of the tine shank and presenting a slot for receiving a transverse resilient wedge that secures the tine to the side of the plate. Each retaining wedge is in the form of a flat spring steel strip turned down at its margins to form outwardly flared slanting flanges that are tapered in depth from end to end. When the resilient wedge is driven into the slots of the spaced stirrups over the tine shank the flared and tapered flanges engage the tine and hold it tightly against the tine plate. As the wedge is driven into the stirrups, its slanting flanges deflect outward and exert a resilient holding force that secures the tine yet permits limited yielding of the tine under impacts to relieve severe forces and shocks. Each wedge is tapered at a gradual angle which permits it to be driven into place readily and at the same time it is self-locking to resist any tendency for the wedge to become displaced under the racking forces encountered during operation of the machine. Furthermore, the wedges are inserted in such direction that during a digging operation the materials being pulverized tend to drive the wedges inward and also tend to accumulate about the wedges to hold them in position. When the cutting edge of a tine becomes worn, the tapered resilient wedge may be driven out readily by means of hammer blows to release the tine quickly even though encrusted, whereupon the tine may be reversed or replaced to present a new cutting edge, a hammer being the only tool required. Removal of the tine from the socket automatically cleans away accumulated encrusted material and this facilitates positioning of the replacement tine. The tines are formed either in U-shape or Z-shape in manner to be universally reversible in application to the tine sockets on the opposite sides of the plates, although tines having cutting heads of other shapes may be formed upon the basic straight bar tine shanks.

The foregoing and other objects will become more fully apparent as the following detailed description of the improved rotary ground working implement is perused in conjunction with its representation in the accompanying drawings illustrative of the invention in its presently preferred form wherein:

FIGURE 1 is a fragmentary view in rear elevation of the left end portion of a ground working rotor embodying the present invention, parts of its protective hood and supporting structure having been broken away to disclose the rotor and its driving mechanism;

FIG. 2 is a view in transverse section through the ground working rotor taken on the plane represented by the line 2—2 in FIGURE 1, the tine holding plates having been partially broken away;

FIG. 7 is a view in perspective of a reversible digging tine of Z-shape;

FIG. 8 is a view in perspective of a corresponding reversible digging tine of U-shape;

FIG. 9 is a view in perspective of a resilient wedge for retaining a tine in a tine socket;

FIGS. 10, 11 and 12 are perspective views similar to FIG. 9 but showing modified forms of the tine retaining wedge; and FIG. 13 is a view in end elevation of the tine retaining wedge shown in FIG. 9.

Figure 3:
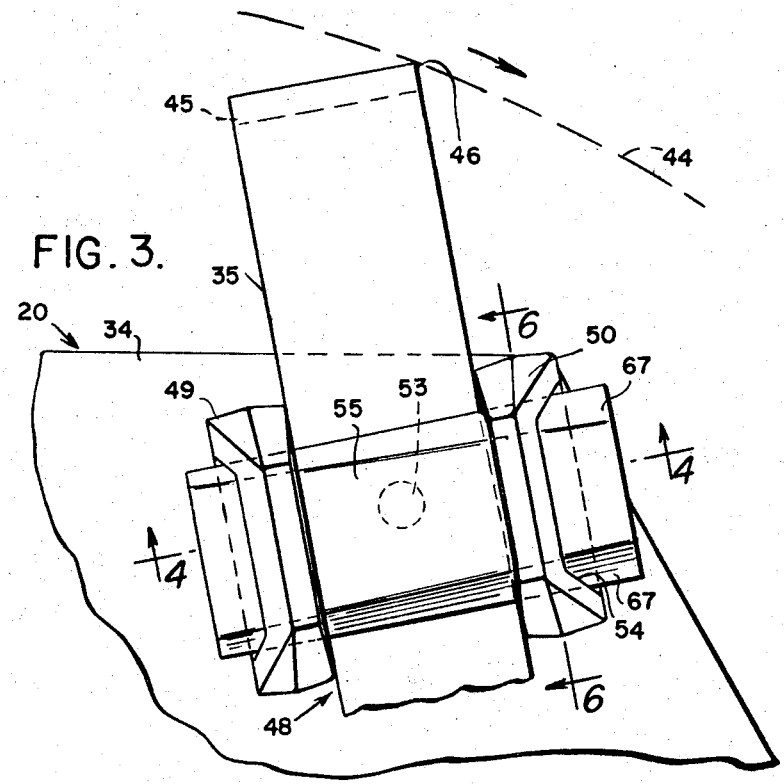
FIG. 3 is an enlarged fragmentary view of part of the tine plate as shown in FIG. 2 together with one of the tine holding socket units and part of a tine held therein.

Rotary ground working implements or tillage equipment of the type particularly benefiting from the advantages of the present invention embody power driven pulverizing and earth treating rotors that may be of various well-known kinds such as, for example, the specific material working rotor set forth in U.S. Patent No. 2,802,408 issued Aug. 13, 1957 to Harry J. Seaman. As there shown and explained, the typical ground working rotor is disposed horizontally and extends transversely of the direction of travel of the implement. With the tine carrying rotor turning, and the machine moving forward, a strip of ground material is pulverized and blended as the implement advances longitudinally, such as in stabilizing the sub-base of a highway or in tilling land for agricultural use.

Referring now more particularly to the apparatus shown in the accompanying drawings, and especially to FIGURES 1 and 2 thereof, the ground working implement or rotary tiller there partially illustrated by way of example as a preferred embodiment of the present invention includes an improved horizontally disposed transverse pulverizing rotor 20. The rotor 20 preferably is carried at the rear of a tractor (not shown) and is rotatably supported therefrom at its respective ends by and between a pair of movably mounted rearwardly and downwardly inclined depending arms 21, only the left one of which is shown in the drawing. As is the usual practice, the rotor 20 operates within an enclosing hood 22 of sheet metal constituting a shell forming a mixing chamber for the material being worked, only part of the forward wall and the left one of parallel side walls 23 of the hood 22 being shown in FIGURE 1.

For establishing the depth of cut to be taken by the rotor 20, the parallel side walls 23 of the hood 22, which lie outwardly of the depending arms 21 at the respective ends of the rotor 20, are provided along their lower horizontal edges with renewable runners or skis constituting depth regulating shoes 24 that slide along the surface of the ground thereby supporting the hood 22 at a fixed position relative to the ground. The depending supporting arms 21 are movably mounted in such manner as to permit the rotor 20 to move up and down within the hood 22. Well-known adjustable stop means (not shown) are provided to limit the downward movement of the rotor relative to the hood. This adjustable stop arrangement, therefore, determines the depth of cut of the rotor relative to the depth shoes 24 that support the hood on the surface of the ground being worked.

The digging rotor 20 comprises, essentially, a horizontally disposed hollow tine shaft 27 that is rotatably journalled at each end in a bearing 28 carried by the inner wall of the respective depending arm 21. As shown in FIGURE 1, each depending arm 21 is of hollow box construction and the end of the rotor shaft 27 that extends into the hollow arm through the bearing 28 is fitted therein with driving sprockets 29. For turning the shaft 27, power transmitting sprocket chains 30 engage and drive the sprockets 29, the chains extending upwardly and forwardly within the hollow arms to engage complementary power actuated driving sprockets (not shown).

Mounted in spaced relationship along the hollow horizontal shaft 27 there are a plurality of tine carrying discs or plates 34 each supporting a number of radially projecting expendable teeth or digging tines 35. As the implement advances with the rotor 20 turning, these tines 35 on the plates 34 pulverize and mix the ground or other material within the hood 22. Operating under these severe conditions, the tines 35 wear away rapidly and require replacement at frequent intervals. The improved tines and new arrangement for detaching them quickly as hereinafter described have overcome the unusual difficulties heretofore experienced in changing tines on implements of this kind.

As shown in FIGURE 1, the hollow shaft 27 is constituted by a plurality of sturdy tubular spool-like sections or units 36 that are bolted together end to end. In the particular machine illustrated, each hollow spool or shaft unit 36 is of length appropriate to carry four of the spaced tine plates 34, the plates being welded securely to the periphery of the tubular shaft in their spaced positions. The opposite ends of each spool unit 36 are provided with complementary bolting flanges 37 and 38, respectively, having matching bolt holes, the right-hand tine plate 34 as shown in FIGURE 1 being adjacent to the right flange 38 while the left tine plate of the group is spaced inwardly from the left flange 37.

At the left end of the rotor 20 the left flange 37 of the spool 36 is bolted to a matching complementary flange 39 on the inner end of a stub shaft 40 that carries the left end tine mounting plate 34 of the rotor. The outer end of the stub shaft 40 extends through the bearing 28 and constitutes the end part of the complete tine shaft 27 that projects into and carries the sprockets 29 within the hollow housing of the arm 21. The left flange 37 of the left spool 36 is secured to the flange 39 of the stub shaft 40 by means of removable bolts 41, similar bolts 41 being used to secure the right flange 38 at the other end of the spool to the complementary left flange 37 of the axially aligned adjacent spool 36, only partially shown in the drawing. By this arrangement, rotors of various lengths may be made up readily by bolting together the appropriate number of individual spools 36 each carrying its complement of tine plates 34 and tines 35, thereby to accommodate different machines of varying widths.

As may best be seen by referring to the top edge of the rotor 20 in FIGURE 1, the individual tines 35 are arranged on the several tine plates 34 in generally longitudinal rows disposed in spiral arrangement, the various spiral rows extending from end to end of the rotor. Referring also to FIG. 2, it may be seen that in this particular implement, the tines on adjacent plates are displaced angularly from one plate to the next by increments of fifteen degrees. Since each spool 36 is provided with four tine plates, the angular displacement between the tines at the left end of the spool and the tines at the right end of the spool adds up to a total of sixty degrees.

In order that the several rotor spools may be interchangeable one with another the several rows of tines also are spaced at sixty degrees and the bolts 41 which secure together the mating flanges 37 and 38 likewise are spaced at sixty degree intervals around the flanges. The holes for the bolts in the flanges 37 and 38, therefore, are so positioned with respect to the rows of tines 35 that any two of the tine carrying spools 36 may be bolted together at any angular relationship in which the bolt holes may be matched without disturbing the continuous spiral relationship of the several rows of tines 35 on the two spools.

As shown in FIG. 2, the fifteen degree relationship obtains between the tines on adjacent plates throughout the rotor and adjacent rows of tines are spaced at sixty degrees to each other. Consequently, should one spool be disconnected and turned through any multiple of sixty degrees and then be reattached, its four sets of tines being spaced at fifteen degree increments to one another will match the corresponding rows of tines of the adjacent spool in the spiral pattern. Thus, throughout the length of the rotor 20 the individual adjacent tines are offset progressively by fifteen degree increments from plate to plate in a multiple spiral arrangement. As the rotor 20 turns, the spirally arranged tines 35 dig into the ground one after the other successively throughout the length of the rotor in a uniform manner whereby the driving torque required is maintained much more uniform than would be the case if the tines were arranged in axially longitudinal rows or groups for example.

As may be seen best in FIG. 2, each tine plate 34 is preferably of hexagonal shape although the plates or discs may be made circular or of any other convenient configuration as desired. The individual tines 35 are removably fastened on both sides of each tine plate 34 preferably in staggered relationship. In the particular rotor illustrated, there are three tines 35 arranged at one hundred twenty degree intervals on each side of each tine plate 34 with the opposing sets of tines offset angularly and mutually interposed to constitute sixty degree intervals between alternate tines thereby matching the spacings of the flange holes that receive the removable bolts 41. It is to be understood, however, that different numbers and arrangements of tines on each plate as well as other angular relationships between the tines on adjacent plates and the number of tine carrying plates on each spool may be varied while still conforming with the spool interchangeability feature provided by the herein described arrangement.

As best indicated in FIG. 2 of the drawing, the individual tines 35 project beyond the edge of each tine plate 34 at a lagging angle which may be in the order of from thirty to forty degrees to present material engaging ends that cut and pulverize the ground. Likewise, all of the tines 35 project outward beyond the edge of the tine plate for the same distance in such manner that their outer ends which engage the ground being worked define and operate in a tine circle 44 when the rotor is turning.

Each individual cutting tool or tine 35 is made from and is formed primarily by a shank of flat bar stock material that constitutes an expendable cutting tooth or blade member that may be replaced readily when worn. The outer end of each tine bar 35 forms the cutting blade element and preferably is bent over laterally at right angles to the shank as may be seen in FIGURE 1 to present a relatively short longitudinally extending head or cutting blade 45 on the shank. As shown, the blade 45 is beveled along each margin to constitute two cutting edges, the leading one of which forms the tip or toe 46 that operates along the tine circle 44. Since each cutting head 45 extends longitudinally of the rotor 20 at right angles to the shank of the tine 35, the cutting blade likewise is disposed at an angle of attack or approach angle of thirty or forty degrees relative to a tangent to the tine circle 44. As indicated in the drawings, the tines 35 of the particular rotor shown are set at an approach angle of about forty degrees for convenience of illustration and, therefore, the cutting blades will enter the ground being worked at that angle of incidence.

The trailing edge or heel of each blade 45 consequently is disposed radially inwardly from the tine circle 44 some three-quarters of an inch or more and this provides the necessary heel clearance between the blade 45 and the ground being worked to permit substantial forward movement of the implement without causing the heel of the blade to drag on or move through the uncut ground. In the event that the implement is to move forward more slowly to effect thorough pulverization, the rotor may be designed to provide for a smaller approach angle in the order of thirty degrees. The larger the angle of incidence of the blades, the more power it takes to turn the rotor in moving the inclined blades through the ground being pulverized and, therefore, it is preferable to use a lower approach angle if sufficient heel clearance is provided. In practice, a cutting blade approach angle of about thirty degrees has been found to be preferable for most purposes.

Since both margins of the cutting head 45 are beveled to present blade edges, the tines 35 may be applied to either side of the tine plates 34 with the blades extending in opposite directions so that the one or the other cutting edge is in operating position. That is to say, the tines 35 may be used either right handed or left handed and this avoids the necessity for providing separate right hand and left hand tines. Furthermore, when the leading edge of a tine head 45 becomes worn away in use, the tine may be removed from one side of the tine plate and fastened on the other side thereby presenting the opposite edge of the head 45 as the cutting tip 46 operating along the tine circle 44. In this manner the leading cutting edge may be replaced by reversing the tine before it becomes so badly worn away that it does not cut the full depth of the tine circle 44 and likewise before it offers excessive resistance to entry into the soil being worked. In addition, each tine 35 may be made reversible by being bent to form a blade at each end thereby presenting two cutting heads 45 having a total of four cutting edges each of which may be used successively until worn, before it becomes necessary to discard the tine.

As best shown in FIGS. 7 and 8, double ended reversible tines 35 each having two blades or heads 45 formed by bending over both ends of the tine shank at right angles, may be either of the Z-shaped type Z as shown in FIG. 7 or of the U-shaped type U shown in FIG. 8. It is apparent that both the Z-tine and the U-tine may be applied to the tine plate 34 in a manner to present either beveled cutting edge of either head 45 as the leading or cutting edge or toe 46 operating along the tine circle 44. That is to say, both the Z-tines Z and the U-tines U are universally reversible in a manner to present the four cutting edges successively as they are worn away in use. As an incidental advantage, the alternate cutting blade or head which happens to be at the inner end of the double ended tine 35 on the rotor 20, serves as a mixing blade to further disintegrate and mix the material that is cut from the ground by the leading edge 46 of the outer head 45 as the rotor turns. By this arrangement, the shank portion of each tine 35 serves to support four cutting edges 46 and, therefore, the amount of bar stock material that is discarded when all of the blades wear out is much less in proportion to blade life than in the case of a tine having only a single cutting edge.

Each tine 35 is secured to the side of a plate 34 facing in one axial direction and the cutting head 45 of the tine 35 extends in the opposite direction and across the periphery of the plate as shown. Additionally, the adjacent cutting heads 45 of the tines carried by adjacent plates 34 overlap or at least extend to midway between such plates so that in the assembled rotor 20 there are cutting edges 46 extending the entire length of the rotor.

Although the tines 35 are shown as provided with heads 45 extending at right angles to the tine shank, it is to be understood that under some circumstances the several tines on a rotor or some of them at least may be in the form of straight bars or shanks without heads and likewise other ground working tines may be formed with T-heads which extend in both directions laterally from the shank or they may be provided with heads of any other shape and type that may be found to be desirable in meeting the particular circumstances of use encountered by the implement. Furthermore, the tine shanks likewise may be made in other shapes and sizes differing from the flat bar material shown in the drawing.

Each individual tool member or digging tine 35 is positioned and supported upon the associated tine plate 34 by means of a tine receiving socket 48 that determines both its angular and its radial position relative to the plate. As best shown in FIG. 3, each tine socket 48 is made up primarily of a pair of spaced parallel flange brackets or abutment members 49 and 50 that engage respectively the opposite edges of the shank of the tine 35 and position it angularly with respect to the plate 34. As appears in FIG. 2, the pairs of spaced brackets or abutments 49 and 50 are mounted alternately on opposite sides of the tine plate 35 and are equally spaced thereon in a manner to properly position the several cutting tines 35 angularly as previously explained. As shown, the shank of each tine 35 fits in the associated socket 48 formed between the spaced abutments 49 and 50 in such manner that cutting forces acting on the cutting edge of the tine are resisted primarily by the trailing abutment 49, the leading abutment 50 serving to provide an additional reaction force to complete a force couple that prevents rearward twisting of the tine in the plane of the disc.

The radial or endwise position of each tine 35 within its socket 48 is established by means of a central round positioning hole 52 pierced through the mid-section of the tine shank and that fits over a complementary stud or locating dowel 53 projecting outward from the surface of the tine plate 34 midway between the two abutments 49 and 50. The dowel or lug 53 is not necessarily in the center of the tine socket 48 but is so positioned radially on the plate 34 that the half of the tine 35 that extends therefrom outwardly projects beyond the plate a sufficient distance to position its leading cutting edge 46 at the predetermined tine circle 44. Since the locating hole 52 is centrally positioned in the tine shank, the tine 35 may be reversed end for end on the stud 53 in the socket 48 with assurance that the leading cutting edge or toe 46 at the other end of the tine will always lie on the same tine circle 44. Likewise, each tine 35 may be applied to a socket on either side of the tine plate 34 with either end 45 of the tine projecting outward thereby to present any one of its four blade edges in precise cutting position as determined by engagement of the central locating hole 52 with the positioning pin or dowel 53 in the particular socket 48 being used.

Although the means for positioning the tine longitudinally relative to the tine sockets 48 on the tine plates 34 is shown as formed by cooperating locating abutments constituted by a stud on the tine plate engaging a central locating hole in the tine, it is to be understood that the locating abutments may be formed in other ways such as by notches in the edges of the tine shank for instance and furthermore under some circumstances more than one set of locating abutments may be provided on the tine shank whereby the tines may be positioned longitudinally in more than one relationship selectively in order that their cutting ends may operate along different tine circles of selected diameters as required.

Figure 4:
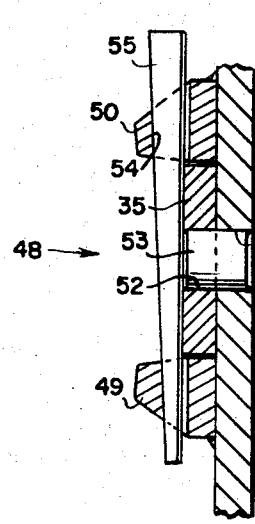
FIG. 4 is a view in transverse section through the tine and the tine holding unit on the plane represented by the line 4—4 in FIG. 3.
Figure 6:
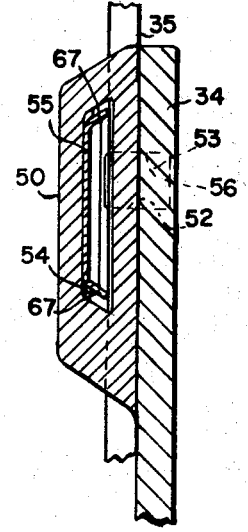
FIG. 6 is a fragmentary view in longitudinal section through the tine and the tine holding unit taken on the plane represented by the lines 6—6 in FIG. 3.

As may best be seen in FIG. 6, each of the tine restraining abutments 49 and 50 extends outwardly beyond the associated tine shank in the form of a loop or stirrup presenting an opening or slot 54 constituting a tunnel for receiving a tapered resilient steel wedge 55 that may be driven in or out readily by means of a hammer or the like. As appears in FIG. 3, the tapered wedge 55 extends through the openings 54 in the stirrup abutments 49 and 50 and over the shank of the tine 53 in such manner that when the wedge 55 is driven home the tine 35 is firmly anchored and held securely in the tine socket 48 between the flanges 49 and 50 and bears against the side of the tine plate 34. Preferably, the looped straps or stirrup abutments 49 and 50 that receive the wedge 55 are securely welded to the sides of the tine plate 34 in the desired positions as indicated in FIGS. 3 and 4. Likewise each locating stud or dowel 53 is preferably fitted in a hole 56 through the tine plate 34 and welded permanently in position properly to locate the tine longitudinally in the tine socket.

Figure 5:
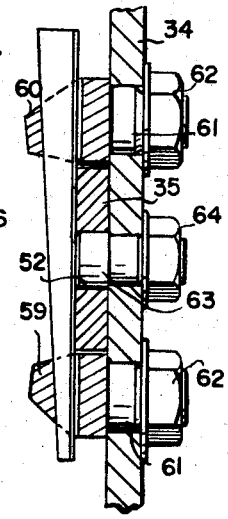
FIG. 5 is a sectional view similar to FIG. 4 but showing a modified tine holding socket arrangement.

If it is desired, however, to apply the improved tine holding arrangement of this invention to an existing machine for instance it may be preferable to utilize the modification shown in FIG. 5. As there shown, modified tine retaining brackets or flanges 59 and 60 are provided with threaded studs 61 that pass through holes drilled in the tine plate 34 and are retained securely by nuts 62 threaded on the studs at the opposite side of the tine plate 34. Likewise a modified locating stud or dowel 63 is threaded at the end which passes through the locating opening 56 in the tine plate 34 and is securely held by a nut 64. By this arrangement, the dowel 63 and brackets 59 and 60 may be replaced readily should they become worn or broken in service. After the modified abutment brackets 59 and 60 are secured to the tine plate 34 by the nuts 62, they operate to position the tine 35 and receive the locking wedge 55 in the same manner as the previously described welded abutments 49 and 50.

As shown separately in FIGS. 9 and 13 each of the resilient tapered retaining wedges 55 is preferably formed from a comparatively thin flat strip of sheet spring steel that is bent longitudinally inward or downward unequally along each edge to form inclined downwardly and outwardly flaring resilient margin elements or flanges 67. The unequally bent depending flanges 67 at each edge are similarly slanted or tapered in width from end to end at a gradual angle to provide the desired wedging action. These resilient wedges 55 are formed most conveniently from long strips of spring steel of uniform width cut off in suitable lengths and bent downward or inward angularly at the edges in generally channel shape to form the tapered depending flanges 67.

As may best be seen in FIG. 6, the tunnel slot or opening 54 in the trailing abutment 49 is somewhat smaller than the opening 54 in the leading abutment 50, the openings or slots being so proportioned that when a wedge is driven through both of the looped stirrups of the abutments 49 and 50 with the down turned tapered marginal edges of the resilient wedge engaging the surface of the tine shank, the wedge clamps the shank throughout its full width. Then as the retainer key or wedge 55 is driven tighter into the slots of the stirrups, the marginal flanged edges 67 deflect and tend to spread outward as they straighten somewhat thereby exerting a slightly resilient restraining force upon the tine 35, the deflecting wedge spring loading it and holding it securely against the tine plate 34.

The tapered depending margins 67 of the wedge 55 are sloped from end to end at an acute or gradual angle ordinarily between two and five degrees and preferably at about three degrees to the plane of the steel strip whereby the wedges are self-locking in the tunnel openings 54 to resist any tendency to loosen after they have been driven home, while also being readily driven out to release the tine from its socket quickly. As shown in FIG. 6, the openings or tunnels 54 through the stirrup loops are in the form of slots that are a little wider than the wedges 55 in order to allow clearance for outward or sidewise expansion and equalizing of the down turned margins 67 as the wedge is tightened to increase its holding power.

As may be seen in FIG. 2, the wedges 55 are driven in from the leading side of the tine sockets 48 through the stirrups brackets 50 and into the trailing brackets 49 whereby as the rotor 20 turns the material being pulverized, in striking the projecting larger end of each wedge 55, tends to drive the wedge tighter and more firmly into the stirrups 49 and 50 thereby opposing any tendency for the wedge to work outward. Furthermore, the material being pulverized tends to pack around each wedge 55 thereby encrusting it and locking it more securely in the stirrups.

During operation, the various digging forces acting upon the bent-over cutting head 45 of each tine 35 tend to twist the tine within the tine socket 48 in all possible directions and about different fulcrums. These forces which tend to move and shift the spring loaded tine within the socket are resisted by the resilient wedge 55 in such manner that when shocks or unusual forces become excessive a limited amount of yielding movement or give is permitted of the tine by flexure of the resilient flanges 67 to accommodate and relieve the excessive forces and shock. This limited yielding when acting with the inherent resilience of the material in the cutting tines 35, operates to reduce the shock and other unusual forces that are transmitted to and act upon the tine carrying rotor 20 and upon other parts of the implement. Furthermore, because of the resilient action of the flaring flanges 67, fretting of the tine 35 in the socket 48 is largely prevented and wearing away of the contacting tine shank and wedge socket is thereby reduced to a minimum. If nevertheless some slight wearing of either the tine or the socket should occur, the resilient action of the flared retaining flanges 67 automatically takes up any looseness that might otherwise result and that could result in further movement and additional wear.

From the foregoing explanation it is apparent that the only tool needed for securing the tines 35 to the tine plates 34 in the manner described, is a hammer or like striking instrument that is used to drive the wedges 55 into the openings 54 of the abutments 49 and 50. Likewise, when it is desired to remove a worn tine for reversal or replacement, the only tool required is the hammer then used to strike the small end of the wedge 55 in a manner to drive it out of the abutment stirrups 49 and 50. Accordingly, it is apparent that no extra equipment such as special tools or wrenches of any kind are required for either attaching or detaching the tines 35, the hammer being the only tool used. A few blows to seat or dislodge the resilient wedge is all that is required in either case and consequently a worn tine can be removed and replaced with minimum delay.

As previously explained, the time and effort heretofore required for removing and replacing digging tines secured by bolts and nuts or similar fastenings has constituted a great hindrance to the efficient use of rotary ground pulverizing equipment of this type particularly because of the occasionally frustrating nature of the work involved in loosening or cutting away bolts that have become rusted in place and encrusted with some of the material that has been mixed by the machine. With the present spring wedge retaining arrangement, any adhering material is loosened and knocked away by the blows of the hammer in striking the small end of the wedge 55 to drive it out of the tine socket. Thus when the wedge is removed, the openings 54 are cleared and likewise when the tine is removed from the tine socket 48 it automatically cleans away accumulated encrustating material and prepares the socket to receive a replacement tine.

Accordingly, although all of the tines are securely retained in position on the rotor, it is apparent that they may be loosened quickly and readily for removal when necessary. Likewise, because of their reversible nature, each tine may be reattached quickly in reversed position to present a fresh cutting edge until all four cutting edges have been worn away. The comparative ease with which worn tines may be removed from the rotor in accordance with the securing arrangement of this invention, encourages removal and reversal or replacement of the tines before they have been worn away to such an extent that digging efficiency is reduced and the amount of power required to turn the rotor is inordinately increased.

Furthermore, because the time required in replacing worn tines obviously is so greatly reduced by use of the spring wedge attachment system, pulverizing implements equipped with the fastening means of the present invention are only out of service for tine changing for a short time and therefore are available for operation during a much greater percentage of working time than has been the case heretofore.

Although the particular resilient wedge 55 shown in FIGS. 9 and 13 is adequate for the purpose of retaining the tine 35, variations of the wedge form can be utilized to advantage under some circumstances. For example, in the modified wedge 68 shown in FIG. 10, the lower or outer edges of the bent down flanges 67 forming the tapered wedge margins, may be bent outward additionally to form flat bearing surfaces 69 that lie parallel with the surface of the tine shank when the wedge is forced into the stirrup openings 54. These flat surfaces 69, therefore, provide a wider bearing contact between the wedge 68 and the tine 35 while permitting the flared flanges 67 to deflect and spread outwardly when the wedge is driven to its tightened position over the tine.

As another variations, it may be desirable in some instances to provide an engagement or securing hole 71 extending through the wedge near the center at one or both ends of the wedge plate, as shown in the modified wedge 72 illustrated in FIG. 11. By this arrangement, the aperture or hole 71 at the inner or thin end of the wedge 72 may in some instances be utilized to receive a cotter pin or the like acting as a keeper to guard against the possibility of the wedge becoming loosened and sliding out of the tine socket. Likewise, the one or the other of the holes 71 may be used in connection with removing the wedge 72 for receiving a suitable prying or pulling tool which may be attached thereby to the wedge for prying or pulling it out of the stirrup openings 54.

As another modification, the wedge 72 may be formed additionally with an embossed or coined upwardly projecting boss or stop member 73 also shown in FIG. 11, that is arranged to pass through the stirrup openings 54 of the leading abutment bracket 50. When the wedge 72 is driven into place, the boss 73 snaps up inside of the abutment 50 to act as a detent or keeper for retaining the wedge in the tine socket.

In still another modification, the upper surface of a similar wedge 74 may be provided with a series of upstruck coined corrugations 75, as shown in FIG. 12 of the drawing, that operate in a manner similar to the boss 73 of the wedge 72 to resist accidental displacement of the wedge.

While these additional wedge retaining detents or keepers shown in FIGS. 11 and 12 may be utilized to advantage in making doubly sure that the wedges will not loosen and come out during operation of the machine, the self-locking characteristics of the gradually tapered flexible wedging flanges 67 and the tendency of the material being worked to drive the wedges tighter into the tine sockets may be relied upon to retain the wedges 55 and therefore the tines 35 under all ordinary circumstances.

From the foregoing description of an exemplifying ground working implement of the rotary type embodying improved long wearing tines and the new quick changing tine holding means of the present invention, together with the explanation of the manner in which the replaceable tines are attached and removed readily, it is apparent that a new and novel arrangement has been provided for overcoming persistent difficulties of long standing heretofore encountered particularly in connection with the removal from a rotor of bolted on diggings tines that have become worn beyond further use and often are heavily encrusted with the material that the machine has been pulverizing.

This new and improved result is achieved by means of the novel quick acting tine fastening arrangement herein set forth involving the use of resilient wedges for securing the tines in operating position on the rotor thereby obviating the need for bolt and nut fastening means or the like. The new spring deflecting wedges operate to retain the digging tines securely in position while yielding slightly to shocks and other excessive forces during operation yet the tines may be removed readily and quickly by driving the wedges out of the tine holding sockets by means of a hammer.

Although a specific example of a typical rotary digging implement and of illustrative improved digging tines and resilient tine holding arrangements have been set forth in detail by way of a full disclosure of a practical working embodiment of the present invention, it is to be understood that the improved tines and tine fastening system herein disclosed may be utilized in connection with other digging implements or similar equipment and in somewhat different structural forms by those familiar with the art without departing from the spirit and scope of the invention as defined in the subjoined claims.

The novel features of this invention now having been fully set forth and explained, I claim as my invention:

1. A tine holding arrangement for releasably retaining digging tines on the rotor plates of a rotary ground working implement, a tine socket comprising spaced parallel looped abutment brackets positioned on a rotor plate in manner to define therebetween a tine receiving groove oriented at a selected approach angle, a positioning stud projecting in the tine receiving groove midway between said spaced abutment brackets at a selected radial position on the rotor plate, a cooperating digging tine formed of flat bar stock and presenting a central positioning hole receiving said positioning stud said flat bar being of width to fit within said oriented tine groove between said parallel looped abutments and being reversible therein to present either end at digging position outwardly of the tine plate, and a resilient retaining wedge formed of spring steel strip bent at its edges to provide tapered outwardly flared flanges and cooperating with said looped abutment brackets to retain said tine in said tine socket when said wedge is driven into said looped brackets over said tine.

2. In a rotary earth working implement, a horizontally disposed rotor shaft, a plurality of tine plates mounted in spaced relationship on said rotor shaft, pairs of spaced looped abutments constituting stirrups positioned on each of said tine plates to form tine receiving sockets, a tine positioning stud projecting from said tine plate centrally between each pair of said spaced stirrups, a digging tine formed from flat bar stock and presenting a central positioning opening said tine being reversibly fitted between said spaced looped stirrup abutments of a tine socket with its positioning opening receiving the associated positioning stud and with one end projecting beyond the edge of said tine plate to constitute a digging blade, and a tine retaining wedge formed from spring steel strip with its margins flared downward and outward to constitute tapered resilient flanges, said wedge extending through said spaced looped stirrups outwardly of said tine with said resilient flanges engaging and retaining said tine in said tine socket, the arrangement being such that said tine is reversibly positioned in said tine socket upon said positioning stud and is readily releasable therefrom by driving out said resilient wedge.

3. Improved tine retaining means for securing expendable earth working tines on rotary tine carrying plates comprising, a pair of looped stirrups mounted in spaced relationship on one side of a tine plate and forming abutments to constitute a tine receiving socket, a locating stud extending outwardly from the side of said plate between said stirrups and within said socket, a replaceable tine of flat bar stock material having a central locating opening said tine being reversibly fitted within said socket between said stirrups with its locating opening engaging said locating stud and with one end of said tine projecting beyond the periphery of said tine carrying plate in earth working position thereon, and a retaining wedge driven through said looped stirrups over said flat tine in manner to retain said tine in said socket and against the side of said plate, the arrangement being such that said wedge may be driven out of said stirrups readily to release said tine for replacement thereof.

4. The improved arrangement for securing an expendable earth working tine on a tine plate that comprises, spaced loops secured on the side of a tine plate in manner constituting abutments forming a tine receiving socket therebetween, a replaceable tine fitted in said tine receiving socket between said spaced abutment loops, and a resilient wedge driven through said spaced loops over said tine in manner to retain said tine resiliently and releasably within said socket upon the side of said tine plate.

5. In a digging rotor for a rotary ground working implement, a horizontally disposed sectional rotor shaft comprising a plurality of independent shaft sections arranged end to end each section being provided on each end with coupling means whereby it may be coupled to any other section in any angular relationship at sixty degree intervals, four tine holding plates rigidly mounted on each shaft section in equally spaced axial relationship thereon, and six digging tines secured on each tine holding plate in equally spaced angular relationship thereon the tines on adjacent plates being angularly offset progressively in the same direction at fifteen degree intervals, the arrangement being such that the progressively offset tines form a series of six rows extending spirally from end to end of said sectional rotor shaft, the individual shaft sections being interchangeable for coupling together in any order at any sixty degree angular interval without changing the spiral relationship of said rows of tines on said rotor.

6. A tine for attachment to a rotor plate of a rotary earth working implement said plate being of the type having tine sockets and locating studs mounted on both sides thereof, said tine comprising a piece of flat bar stock forming a shank presenting a central locating opening and having at its respective ends cutting heads extending from said shank at right angles laterally in opposite directions and each presenting cutting edges at its opposite sides, whereby said tine may be reversibly received in any two tine sockets mounted respectively on opposite sides of the rotor plate in a manner to present successively four cutting edges.

7. In a rotary earth working machine including a driven transverse shaft carrying a series of flat tine plates thereon for rotation therewith, the improved arrangement for releasably securing expendable digging tines on the tine plates that comprises, the combination with a rotary tine plate, of a pair of looped stirrups mounted in space relationship on one side of said tine plate in manner constituting side engaging abutments forming therebetween a tine receiving socket disposed at a lagging angle of between thirty and forty degrees to a radius of said tine plate, a replaceable digging tine fitted between said spaced stirrups in said tine receiving socket and against the side of said plate with one end of said tine extending at said lagging angle beyond the periphery of said plate with its outer end in earth working position thereon, and a tine retaining spring deflecting resilient wedge driven through said spaced looped stirrups transversely of and over said tine in manner to wedge said tine against the side of said tine plate for securing said tine yieldingly to said plate between said abutments, the arrangement being such that said tine may be released for replacement readily by driving said resilient retaining wedge out of said stirrups.

8. A retaining wedge for holding a digging tine in a slotted tine socket of a rotor on a rotary ground working implement, comprising a strip of sheet spring steel bent downward along its longitudinal edges to form tapered outwardly and downwardly flaring resilient marginal wedging elements the outer lower edges of which lie in a plane disposed at an acute angle of between two and five degrees to the plane of said steel strip, the arrangement being such that when said wedge is driven into the slots of a tine socket with said tapered marginal elements engaging a digging tine in the tine socket, said wedge is self-locking therein and the tine is held securely though somewhat yieldingly by said resilient flaring marginal elements while being releasable readily by driving out said wedge.

9. In a rotary earth working machine including a driven transverse shaft carrying flat tine plates having replaceable digging tines, the improved arrangement for releasably retaining the expendable digging tines on the flat tine plates that comprises, the combination with a flat rotary tine carrying plate, of a replaceable digging tine of flat bar stock material applied flatwise to one side of said tine plate with one end of said tine projecting beyond the periphery of said plate in earth working position thereon, a pair of looped stirrups mounted on said one side of said tine plate at the respective edges of said flat tine in position to constitute spaced abutments forming therebetween a tine receiving socket, and a tine retaining wedge driven transversely of said tine and outwardly thereof through said spaced looped stirrups in manner to force said tine against said side of said flat tine plate for releasably securing said tine to said plate between said spaced abutments thereon, the arrangement being such that by driving out said retaining wedge said tine may be released readily for replacement.

10. In a tine holding arrangement for retaining a digging tine on a ground working implement, a tine holding socket device including spaced slotted abutments adapted to receive a digging tine therebetween, and a resilient retaining wedge of spring steel strip material bent to tapered channel shape and presenting an upstruck detent projection, said resilient wedge being driven into said spaced slotted abutments transversely of a digging tine in said socket to hold said tine securely therein with said upstruck detent projection disposed between said abutments to retain said wedge in said socket.

11. In a digging rotor for a rotary ground working implement, a sectional rotor shaft comprising a plurality of similar interconnected shaft sections arranged end to end with each section being provided on each end with coupling means whereby each section may be coupled to any other section in any of a plurality of equally spaced angular relationships, and a plurality of digging tines secured on each shaft section said tines being arranged in equally spaced similar rows extending generally longitudinally of said shaft section and spaced angularly at intervals equal to the angular spaced relationship at which said shaft sections may be coupled to one another, the arrangement being such that said shaft sections may be interchanged and interconnected in any of said angular relationships without changing the relationship between said longitudinally extending rows of digging tines on adjacent shaft sections.

12. A retaining wedge for holding a digging tine in a slotted tine receiving socket of a ground working implement, comprising a strip of spring steel bent along its longitudinal edges to tapered channel shape presenting outwardly flaring resilient marginal wedging elements the outer edges of which lie in a plane disposed at an acute angle of about three degrees to the plane of said steel strip, the arrangement being such that when said resilient wedge is driven into the slotted tine receiving socket over a digging tine therein, said tapered resilient marginal elements deflect outwardly to hold the tine securely though somewhat yieldingly in the socket.

13. In a rotary earth working machine including a transverse shaft carrying flat tine plates with extending digging tines, an improved arrangement for securing expendable digging tines to the flat tine plates comprising, a pair of spaced stirrups having wedge receiving openings mounted on one side of a rotary tine plate in manner to constitute therebetween a tine receiving socket, a replaceable tine fitted longitudinally in said socket between said stirrups with said stirrups constituting edge engaging abutments and presenting said wedge receiving openings outwardly of said tine, and a retaining wedge driven through said wedge receiving openings of said stirrups transversely of said tine and outwardly thereof in a manner to retain said tine releasably in said socket and against the side of said rotary tine plate in digging position thereon.

14. In combination with a rotary earth working machine of the type having a rotor shaft on which are mounted spaced tine carrying plates each plate having radially extending digging tines, the improved arrangement for securing each tine to the plate comprising, spaced abutment means attached to one side of the plate for positioning the tine and including a pair of spaced stirrups having aligned elongated openings on the respective opposite sides of the shank of the tine, and a retaining wedge drivable in one direction into the openings transversely of the tine shank over and in contact with the outer flat surface thereof to secure the tine between the abutments and against the plate, the wedge being drivable in the opposite direction out of the openings whereby the tine may be demounted from the plate as for replacement.

15. A tine of the type which is demountably attachable to either side of the spaced tine carrying plates of an earth working rotor, comprising a piece of flat bar stock forming a shank and having its ends bent to form double-edged cutting heads extending from the shank at right angles in opposite directions thereby forming a four-edged tine which may be reversibly attached to one side or the other of a plate in a manner to utilize any one of the cutting edges with the cutting head of the attached tine extending across the periphery of the plate and terminating midway between the plate and its adjacent spaced plate whereby in the assembled rotor cutting edges extend the entire length of the rotor.

References Cited

UNITED STATES PATENTS

| | | | |
|---|---|---|---|
| 2,241,675 | 5/1941 | Rinehart | 172—548 X |
| 2,403,078 | 7/1946 | Hettelsater | 172—550 X |
| 2,823,597 | 2/1958 | Kelsey | 172—120 X |
| 3,087,557 | 4/1963 | Hohstadt | 172—112 X |
| 3,128,831 | 4/1964 | Arndt | 172—123 |

ABRAHAM G. STONE, *Primary Examiner.*

J. R. OAKS, *Assistant Examiner.*